Feb. 14, 1967  E. FRISCH  3,304,234
FUEL ELEMENT FOR NUCLEAR REACTORS
Original Filed Sept. 19, 1956  7 Sheets-Sheet 1

Feb. 14, 1967   E. FRISCH   3,304,234
FUEL ELEMENT FOR NUCLEAR REACTORS
Original Filed Sept. 19, 1956   7 Sheets-Sheet 2

INVENTOR
Erling Frisch
BY G. T. Stratton
ATTORNEY

Feb. 14, 1967  E. FRISCH  3,304,234
FUEL ELEMENT FOR NUCLEAR REACTORS
Original Filed Sept. 19, 1956  7 Sheets-Sheet 4

Feb. 14, 1967 E. FRISCH 3,304,234
FUEL ELEMENT FOR NUCLEAR REACTORS
Original Filed Sept. 19, 1956 7 Sheets-Sheet 5

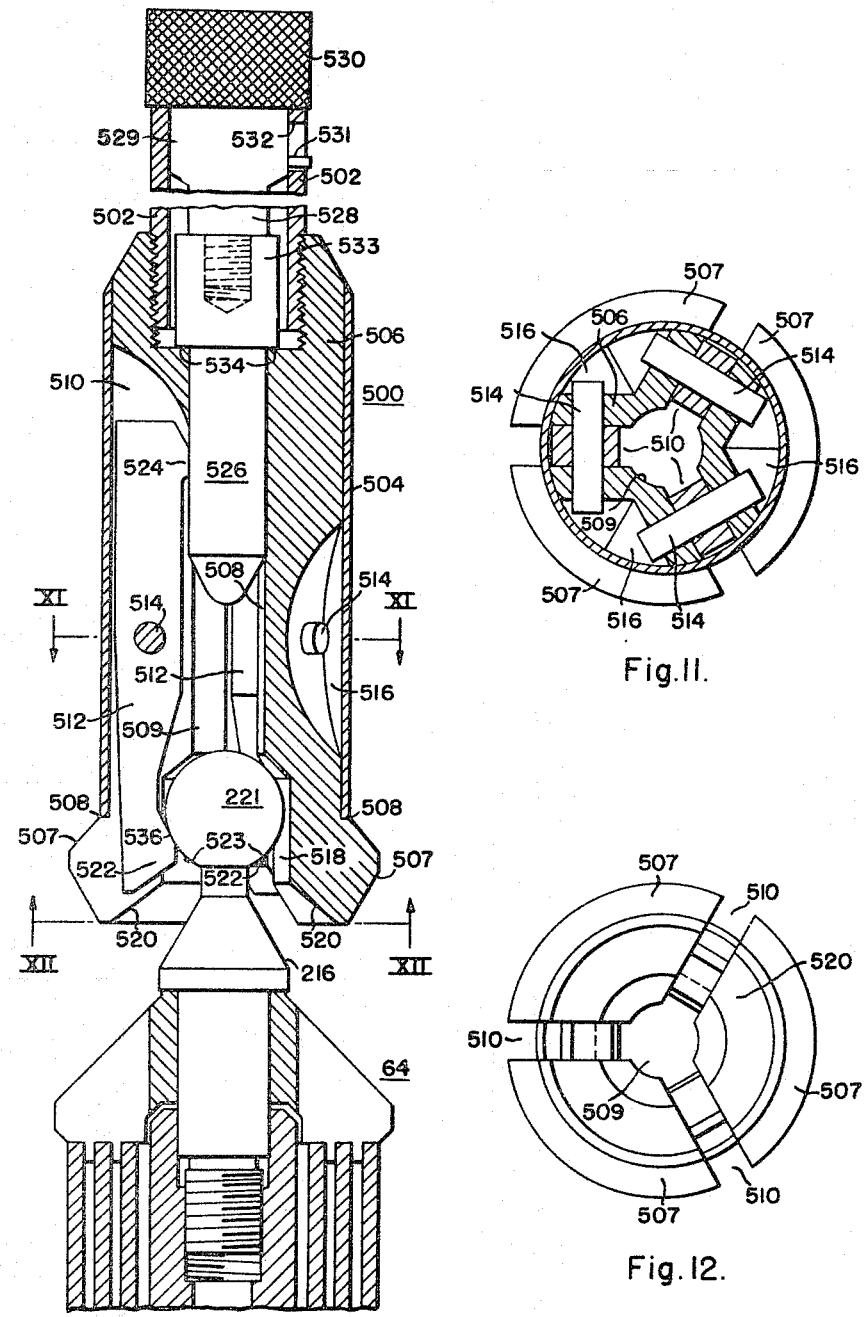

United States Patent Office 3,304,234
Patented Feb. 14, 1967

3,304,234
FUEL ELEMENT FOR NUCLEAR REACTORS
Erling Frisch, Pittsburgh, Pa., assignor to Westinghouse Electric Corporation, Pittsburgh, Pa., a corporation of Pennsylvania
Application Jan. 30, 1961, Ser. No. 85,877, now Patent No. 3,194,740, dated July 13, 1965, which is a continuation of application Ser. No. 610,821, Sept. 19, 1956. Divided and this application May 20, 1965, Ser. No. 457,362
10 Claims. (Cl. 176—76)

This application is a division of copending application Serial No. 85,877, entitled, "Nuclear Reactor," filed January 30, 1961, by Erling Frisch, now Patent No. 3,194,740, issued July 13, 1965, and also assigned to the present assignee, which is a continuation of copending application Serial No. 610,821, entitled, "Nuclear Reactor," now abandoned, filed September 19, 1956, by Erling Frisch, and also assigned to the present assignee.

The present invention relates to nuclear reactors, and more particularly to a fuel element for a pressurized water reactor adapted to be operated either for testing or for power purposes.

In a nuclear reactor of the character described a neutron-fissionable isotope, such as $U^{233}$, $U^{235}$, or $Pu^{239}$, or mixtures thereof is subjected to fission by absorption of thermal neutrons, with the result that a self-sustaining chain reaction within the isotope is established by an excess of neutrons evolved by the fission. In general the reactor comprises a number of fuel elements of fissionable material, for example natural or enriched uranium encased within a suitable protective covering. The fuel elements are disposed in a neutron slowing material which slows the fast neutrons evolved in each atomic fission to thermal energy levels thereof, at which the neutrons are most efficient to induce fission within the uranium or other atomic fuel. The slowing material is termed a neutron moderator and preferably is formed of a substance having the characteristics of relatively small neutronic capture cross section and relatively large scattering cross section. The heat evolved by the chain reaction is removed generally by passage of a suitable coolant through the reactor core in heat exchange relationship with the fuel elements disposed therein. Specific details of the operational theory of such reactors are set forth in Enrico Fermi and Leo Szilard Patent No. 2,708,-656, dated May 17, 1965.

Although the nuclear reactor forming a subject of this invention will be described primarily in arrangements thereof adapted for testing purposes, it will be apparent as this description proceeds that the reactor disclosed herein can be readily operated to produce electrical or other forms of usable power.

Heretofore, nuclear reactors frequently have comprised very elaborate and expensive core and control rod assemblies that are difficult to product and to maintain. Because of the radioactive nature of the atomic fuels used therein and because of the complicated mechanical structures utilized to suspend the fuel elements within the core assembly, the fuel elements contained in prior reactors have been difficult and hazardous to withdraw for purposes of replacing the atomic fuels therein. Moreover, the arrangements utilized in prior reactors have limited the percentage burnup of the atomic fuels attainable in those reactors. The fuel elements themselves have been assembled usually into a bundle thereof by painstaking welding processes which further increase the expense, complexity, and skill required in fabrication in prior reactor cores. Furthermore, the extensive amount of operator contact with radioactive materials encountered in the fabrication of prior reactor cores greatly increased radioactive hazards to personnel engaged in assembling the reactors.

The prior reactors of the character described have suffered from the further disadvantage that no efficient means have been provided for compensating for neutronic fluxile perturbations occasioned within the reactor upon the withdrawal of the control rods relative to the reactor core. Thus, the withdrawal of the control rods associated with prior reactors has produced an uneven neutronic fluxile density within the reactor core, which operates to diminish the percentage burnup of atomic fuel otherwise attainable and tends to produce uneven heating or hot spots within the reactor core. As a result, the life of prior reactor cores has been unnecessarily shortened and the control thereof essential to produce an even heating of the fuel elements therewithin has been difficult and hazardous.

The fuel arrangements frequently used in prior reactors necessitated using enormous amounts of water or other coolants to maintain the reactor core at selected operating temperatures. In the case of forced circulation cooling, considerable amounts of power must be expended in circulating the coolant; and where the coolant is used also as a moderator, as in prior pressurized reactors, the expenditure of power is increased even further. The customary use of the same fluid material for both coolant and moderator material in prior reactors not only has increased the total volume of liquid which has to be pumped through the nuclear reactor, but has hitherto resulted in the selection of a single material embodying necessary but inadequate and undesirable compromise among the characteristics of low neutron capture cross section, heat conductivity, non-corrosiveness, and the like. Moreover, the reactor fuel arrangements utilized heretofore have rendered difficult any variation in peak power output attainable from the nuclear reactor as by varying the collant to fuel ratio of the reactor core.

In order properly to select structural and other materials for use in nuclear reactors it is necessary to test such materials under the operating conditions to which the materials will be subjected, inasmuch as comparatively little is known concerning the neutron absorption and reflection properties, radiation stability, high temperature corrosion and erosion resistance in various coolants and moderators, and related properties of many materials which may be proposed for use in fabricating and operating nuclear reactors. Such materials have heretofore been selected largely on a trial-and-error basis, and no convenient arrangement has been provided for testing such materials at positions of high fluxile density and under conditions of high temperature and pressure within the reactor core without necessitating opening the reactor vessel or core in order to insert or to remove the test specimens.

Accordingly, an object of the invention is to furnish a more efficient and relatively inexpensive nuclear reactor system, and particularly the core structure thereof.

Another object of the invention is to facilitate cooling the core of a nuclear reactor.

A further object of the invention is to improve the fuel element arrangement within a reactor core.

Still another object of the invention is to increase the percentage burnup of atomic fuel utilized in a nuclear reactor.

Yet another object of the invention is to provide improved testing means associated with the core of an atomic reactor.

Another object of the invention is to furnish an improved fuel element for a nuclear reactor.

A further object of the invention is to facilitate variation in peak power output and neutronic fluxile density of a reactor.

Still another object of the invention is to reduce shutdown time required to change or to rearrange the fuel elements of an atomic reactor.

Still another object of the invention is to improve means for handling the fuel elements of a nuclear reactor.

Yet another object of the invention is to provide means for efficiently compensating undesirable neutronic fluxile perturbations within the reactor core occasioned by withdrawal of the control rods therefrom.

Another object of the invention is to facilitate shielding an atomic reactor.

The aforementioned and other objects, features and advantages of the invention will be made more apparent during the ensuing description of illustrative forms thereof, which description is to be taken in conjunction with the accompanying drawings wherein:

FIG. 10 is a longitudinal sectional view of a fuel element handling tool shown in engagement with one of the fuel elements.

FIG. 11 is a sectional view taken along lines XI—XI of FIG. 10, and

FIG. 12 is a bottom view of the handling tool taken along the lines XII—XII of FIG. 10.

In accordance with the invention, a nuclear reactor is provided, wherein the core thereof is submerged under a head of circulating coolant and means are associated with the core, in one application of the invention, for separating the cooling and moderating portions of the circulating fluid or fluids. The fuel elements supported within the core of the reactor are furnished in a novel form which, in conjunction with means provided by the invention for supporting the elements, permits facile removal or insertion of the fuel elements, thereby facilitating assembly of the core and minimizing shutdown time required to replace, interchange, or recycle the fuel elements. In order to minimize perturbations in the neutronic flux within the reactor core, means are provided whereby a fuel element is inserted progressively into the reactor core when the control rod is withdrawn, as in starting up the reactor, or when otherwise manipulating the control rod to control the reactor during operation thereof.

In other applications of the invention the reactor core is provided with a number of testing facilities whereby samples of various structural, cooling, and moderating materials can be tested under differing conditions of temperature, pressure, and fluxile density. Additionally, means are provided for facilitating handling of the fuel elements and for improving the circulation of coolant therethrough. The structure of the fuel elements and their arrangement within the core is such that the peak power output or fluxile density of the reactor core can be changed readily by varying the number or the arrangement of the fuel elements within the reactor core or by easily adding or subtracting atomic fuel from the individual fuel elements.

Figure 1:
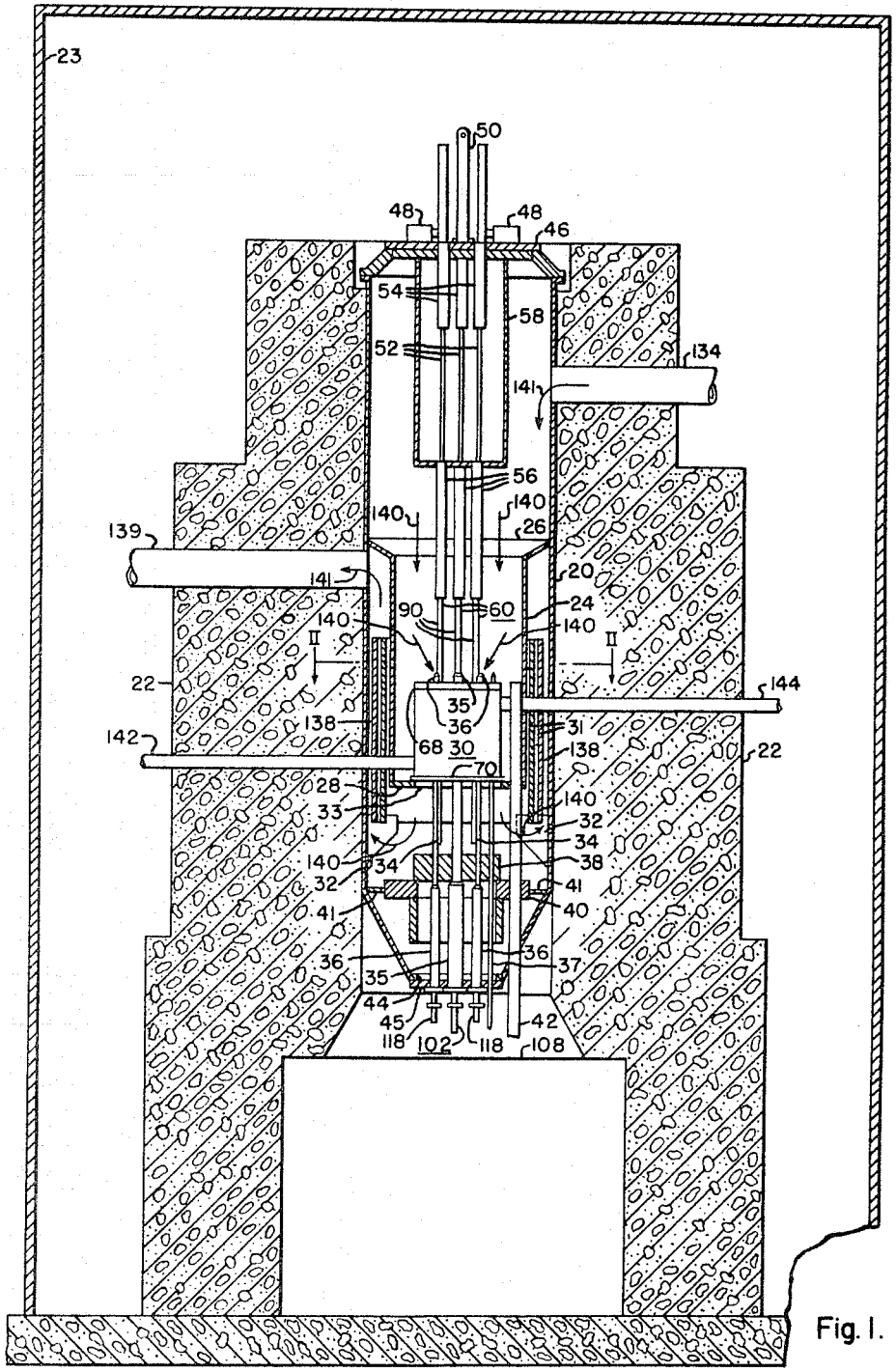
FIGURE 1 is a vertical sectional view of one form of an atomic reactor constructed according to the principles of this invention.
Figure 2:
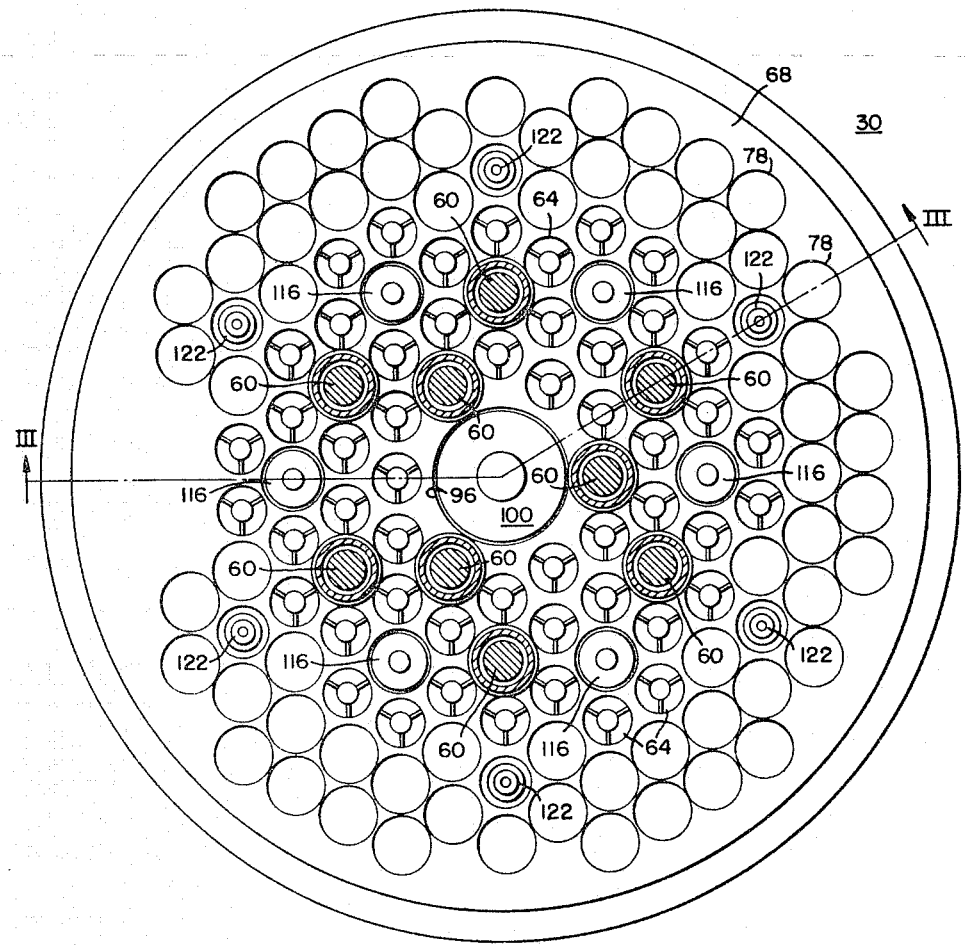
FIG. 2 is an enlarged sectional view of the reactor core taken along reference lines II—II of FIG. 1.
Figure 3:
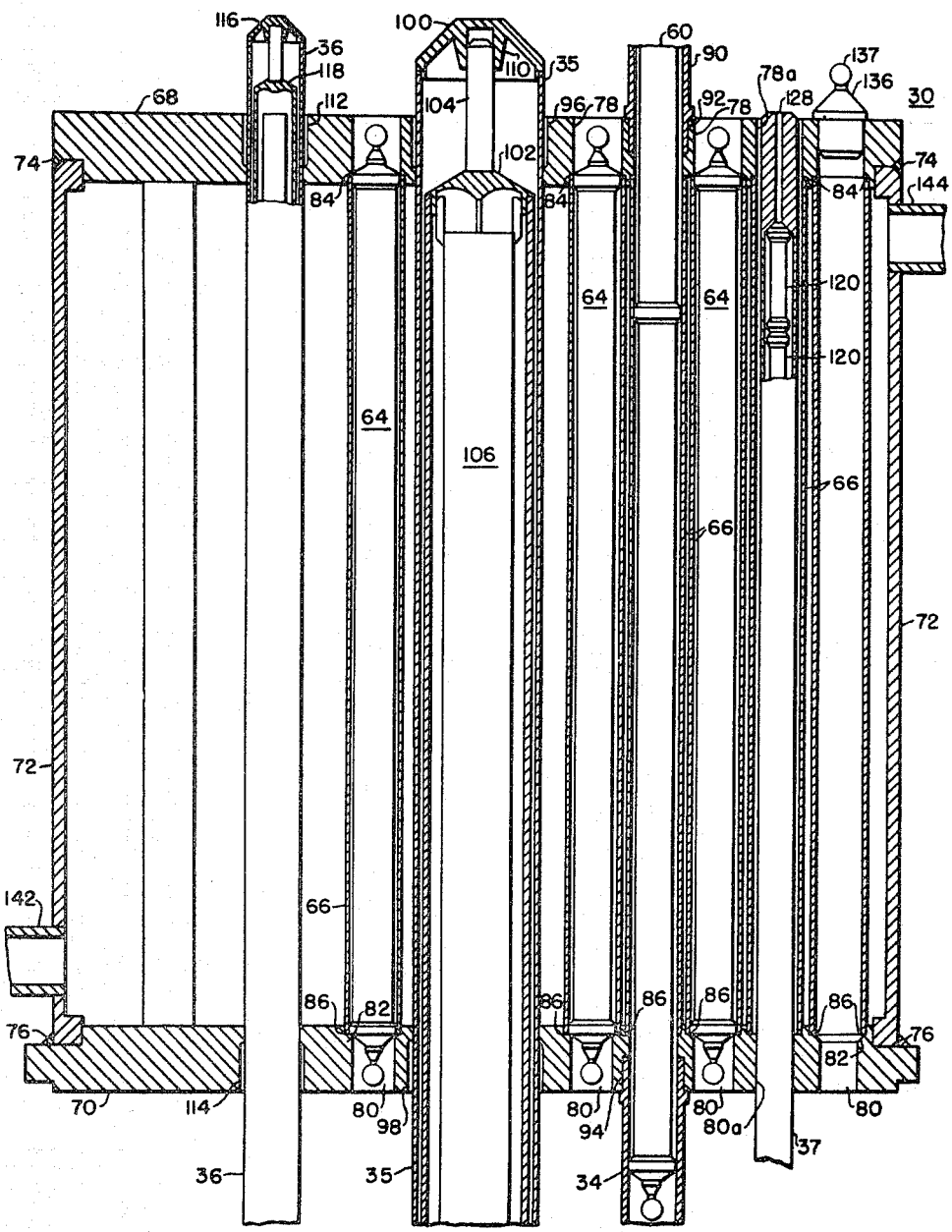
FIG. 3 is a sectional view taken along reference lines III—III of FIG. 2.

Referring now more particularly to FIGS. 1 to 3 of the drawings the exemplary form of the invention shown therein includes a reactor vessel 20 supported within a radioactive shielding structure indicated generally at 22 and comprising, for example, concrete and a densifying material such as magnetite. The reactor vessel, shielding, and associated parts are desirably confined within a vapor-tight enclosure 23, or its equivalent, adapted for preventing the escape of radioactive gases or dust into the atmosphere. Secured within the reactor vessel 20 is an inner cylindrical member or supporting baffle 24 terminating at the upper end thereof in a frustoconical portion or flange 26 whereby the cylindrical member 24 is secured to the inner walls of the reactor vessel 20. Adjacent the other end of the cylindrical member 24 is secured a core supporting plate 28 upon which a reactor core 30 rests. A number of thermal shields 31 are mounted between the cylindrical member 24 and the vessel 20 in positions adjacent the reactor core 30. The thermal shields 31 are supported by brackets 32 in spaced relation to one another and to the cylindrical member 24 and vessel 20 for purposes hereinafter made apparent. The core supporting plate 28 is furnished with a relatively large central aperture 33 through which there protrudes from the reactor core 30 a plurality of control rod lower shroud tubes 34 and a number of tubular casings 35, 36 and 37 provided for the insertion of various testing thimbles into the reactor and presently to be described in greater detail. The tubular casings 35, 36 and 37 pass through the biological shielding members 38 and 40, which are secured relative to the reactor vessel 20 by means of a supporting plate 41. A vertical transfer tube 42, secured by the shielding member 40 and by the core supporting plate 28, extends downwardly through the bottom portion of the reactor vessel 20 together with the tubular casings 35, 36 and 37. Casings 35, 36 and 37 are secured and sealed in a well-known manner relative to reactor vessel 20 at points of their junction with suitable apertures in the hermetically sealed bottom closure 44 of the reactor vessel 20 by means of the sealed joints indicated generally by reference character 45. A number of testing thimbles, presently to be described, are inserted through the casings 35, 36 and 37 and into the reactor core.

The upper end of the reactor vessel 20 is hermetically sealed by a removable closure 46 upon which are mounted a number of conventional control rod drive mechanisms 48 and a lifting lug 50. The drive mechanisms 48 are arranged to cooperate with a plurality of control rod drive-shafts 52 which are supported within individual upper guide sleeves 54 secured to the closure 46 and within individual lower guide sleeves 56 which are secured to a control rod drive shaft enclosure 58 suspended from the underside of the removable vessel closure 46. Control rod assemblies 60 are secured to the respective drive shafts 52 by means of scram magnet 62 (FIG. 7), presently to be described in greater detail. Therefore, the control rod assemblies 60 can be scrammed or detached from the drive shafts 52 in order to terminate the chain reaction in the core 30 in case of an emergency or accident, or to permit removal of the closure 46 together with the drive mechanisms 48, guide sleeves 54 and 56 and the associated drive shafts 52. Thus, convenient access can be had to the interior of the reactor vessel 20 and to the core 30 for adding, replacing or rearranging fuel elements 64 (FIGS. 2 and 3) in a manner presently to be described.

As better shown in FIG. 3, the fuel elements 64 are spacedly supported within reactor core sleeves 66, which sleeves are secured within the reactor core 30 between end plates 68 and 70. The end plates 68 and 70 are hermetically sealed to casing 72 of the core 30, as by annular welds 74 and 76. The upper end plate 68 is provided with a plurality of apertures 78 of a size suitable for the admission of the fuel elements 64 and of the control rod assemblies 60. The bottom end plate 70 is furnished with a like plurality of apertures 80 disposed in alignment with the apertures 78 of the upper end plate but having a smaller diameter, except as hereinafter noted in connection with apertures 78a, than the first-mentioned apertures, in order to provide support for the fuel elements 64 which are inserted vertically into the sleeves 66 of the reactor core 30. Both ends of the fuel elements 64 are shaped to engage a chamfer 82 provided adjacent the inner end of each of the bottom plate apertures 80. The fuel elements 64 are furnished with means presently to be described for permitting the flow of water through the reactor core sleeves 66 in order to afford cooling of the fuel elements 64.

The reactor core sleeves 66 are maintained in alignment with one another and with the reactor core 30 as a result of their being inserted into counterbored portions 84 and 86 of the apertures 78 and 80, respectively. The counterbored portions 84 and 86 may be drilled further through the end plates 68 and 70, respectively, and the length of the sleeves 66 may be increased accordingly, to facilitate hermetically sealing, as by welding, the sleeves 66 at each end thereof to the end plate 68 or 70, where such hermetic sealing is required as will subsequently be pointed out. Thus, each of the apertures 78 in the upper end plate 68 is coupled to a matching aperture 80 in the bottom plate 70 by means of the reactor core sleeves 66.

A plurality of control rod assemblies 60, nine being shown in this example of the invention (FIG. 2), are insertable through selected ones of the apertures 78 and 80 and associated reactor core sleeves 66 at suitable positions among the fuel element lattice of the reactor core 30. The control rod assemblies 60 are insertable through the reactor core 30 by means of upper shroud tubes 90 and the lower shroud tubes 34 threaded, respectively, into the tapped portions 92 and 94 of certain of the apertures 78 and 80.

For testing various materials under conditions of high pressure and temperature and at areas of maximum neutronic fluxile densities within the reactor core, the centrally disposed tubular member 35 extends upwardly through the reactor core 30 via apertures 96 and 98, provided, respectively, in the upper and lower end plates 68 and 70. The upward end of the tubular member 35 is closed by a cap 100 which can be hermetically sealed to the tubular member 35 in those cases where it is desired to prevent leakage of fluid from the reactor core into the tubular member 35. A high pressure testing thimble 102, terminating in rod-like projection 104 and having testing specimens indicated generally by the cylindrical body 106 hermetically sealed therein, is inserted upwardly into the reactor core 30 from underneath the reactor vessel 20. A space 108 (FIG. 1), is provided within the concrete shield 22 and below the reactor vessel 20 for the purpose of receiving suitable machinery and affording ample workspace for handling and inserting the high pressure testing thimble 102 and similar testing units presently to be described. The rod portion 104 secured to the upper end of the testing thimble 102 is arranged to be inserted into an annular projection 110 on the cover 100, for the purpose of centering the testing thimble 102 relative to the tubular casing 35 and the reactor core 30.

In a similar manner the tubular casings 36, six being utilized in this example of the invention, protrude upwardly through apertures 112 and 114 provided, respectively, in the upper and lower end plates 68 and 70 and are sealed at the upward ends thereof by caps 116. Insertable into each of the tubular casings 36 from a position within the space 108, and in a manner similar to that described in connection with the high pressure testing thimble 102, is a high pressure testing thimble 118 similar in structure to the aforesaid thimble 102. The tubular casings 36 and associated testing thimbles 118 are desirably placed in areas of high neutronic fluxile density within the reactor core 30.

Adjacent the outer periphery of the reactor core 30 an additional testing facility is provided within the reactor core 30 comprising the "rabbit" tubes or casings 37, six being utilized in this example and arranged for the quick insertion or withdrawal into the reactor core 30 of a number of sealed tubular sections 120, which can be quickly inserted into the tubular casings 37 from the space 108 beneath the reactor by a suitable valve and pressurized fluid arrangement. The "rabbit" facilities or casings 37 are provided of such diameter to form a loose fit with the apertures 78a and 80a provided, respectively, in the upper and lower end plates 68 and 70 of the reactor core. The tubular casings 37 are thus aligned relative to the associated reactor core sleeves 66 by means of the apertures 78a and 80a. The upward end 122 (FIG. 2) of each tubular casing 37 is provided with a vent 128 to relieve pressures developed forwardly of the casings 120 during insertion thereof into the reactor core, and to permit the passage of coolant through the casing and around the loosely fitting tubular sections 120.

For purposes of cooling the fuel elements 64 and for removing the thermal energies developed therein for conversion to other forms of energy, in the case of power reactors, suitable coolant is pumped into the reactor vessel 20 via an inlet conduit 134. The coolant flows downwardly of the vessel 20; and in one application of the invention all of the coolant flow is directed entirely through the reactor core sleeves 66 being used, the unused sleeves 66 being closed at the upper ends thereof by means of solid plug members 136 inserted into the associated apertures 78 in the upper end plate 68 of the core 30. The plug members 136 are provided with spheroidal knobs 137 for purposes presently to be enumerated. Since the coolant flow is downwardly of the core 30, no means is required to secure the fuel elements 64 and the plugs 136 other than gravity and the support provided by the associated end plates 68 and 70. Thus, in adding, removing or rearranging the fuel elements 64, the same merely need be lifted out of the sleeves 66 and replaced as desired by means presently to be described, thereby greatly facilitating refueling the reactor and minimizing the time lost in this operation. As indicated heretofore, the coolant enters the apertures 78 of the upper plate 68, which are not closed by plugs 136 and flows downwardly through the sleeves 66 and around and through the fuel elements 64 to effect cooling thereof and out through the apertures 80 of the bottom plate 70. The coolant then passes upwardly through annular passages 138 formed by the cylindrical member 24, the walls of the reactor vessel 20, and thermal shields 31, and leaves the reactor vessel 20 through an outlet duct 139. The flow of coolant through reactor vessel 20 is indicated by flow arrows 140 and 141.

As will be apparent from the foregoing, the space enclosed within the reactor core 30 and between the reactor core sleeves 66 can be hermetically sealed from the interior of the reactor core sleeves 66 and consequently from the coolant passing therethrough. Thus, in one application of the invention, an efficient moderator fluid, i.e. one having low neutronic absorption and high neutron-scattering power, can be maintained within the reactor core 30 but can be prevented from contacting an efficient coolant fluid, i.e. one having satisfactory heat transfer characteristics and passing through the sleeves 66. Since the moderator fluid will not then contact directy the fuel elements 64, the comparatively small amount of heat produced therein will reduce greatly the required volume of flow thereof through the reactor core 30. Thus, only a small proportion of the total fluid within the reactor core 30 need be changed constantly in order to cool the fuel elements 64, and consequently the flow of the coolant will take place only through those reactor core sleeves 66 which are occupied by the fuel elements 64 and the control rod assemblies 60, as will be described presently in greater detail.

For admitting and removing moderator fluid relative to the core 30, inlet and outlet conduits 142 and 144 are provided, which conduits extend outwardly through the cylindrical member 24, the reactor vessel 20, and the concrete shielding 22. With this arrangement whereby the moderator is maintained in a chamber which is effectively separated from the coolant stream, it will be apparent that a moderator can be utilized which is different in composition from that of the coolant. For example, light water or $H_2O$ can be utilized for coolant, since a comparatively large volume will be required, whereas heavy water or $D_2O$ can be utilized for the moderator material, which is required in much smaller volume than that of the coolant stream. Accordingly, heavy water, which is a considerably more effective moderator, but also a much more expensive material, than light water, can be utilized in the most efficient and inexpensive manner within the nuclear reactor. The use of heavy water permits the use of natural uranium as the atomic fuel, whereas less efficient moderators require the use of more costly, enriched uranium. Thus, a material having effective moderating characteristics, but poor heat transfer characteristics, for example light and heavy water, carbon dioxide, or an organic material, can be utilized within the reactor core 30 but outside the reactor core sleeves 66; while another material, for example a liquid metal, having excellent heat transfer characteristics but a relatively poor moderating characteristic, can be utilized for cooling and energy transfer purposes and can be confined within the reactor core sleeves 66.

Alternatively, the conduits 142 and 144 can be omitted, and a number of small flow holes (not shown) can be provided in each end plate 68 or 70 and spaced from the apertures 78 and 80, respectively. It is contemplated that the flow holes will be of such size as to divert a small proportion of the coolant stream entering from the conduit 134 into those portions of the reactor core 30 between the sleeves 66. This portion of the coolant stream then serves as the moderating fluid in those applications of the nuclear reactor wherein it is desired to utilize a single moderator-coolant fluid. The flow of fluid through the aforesaid flow holes need be only sufficient to prevent stagnation (and overheating if the reactor be used for power purposes) of the fluid within the moderator section of the reactor core 30.

Figure 4:
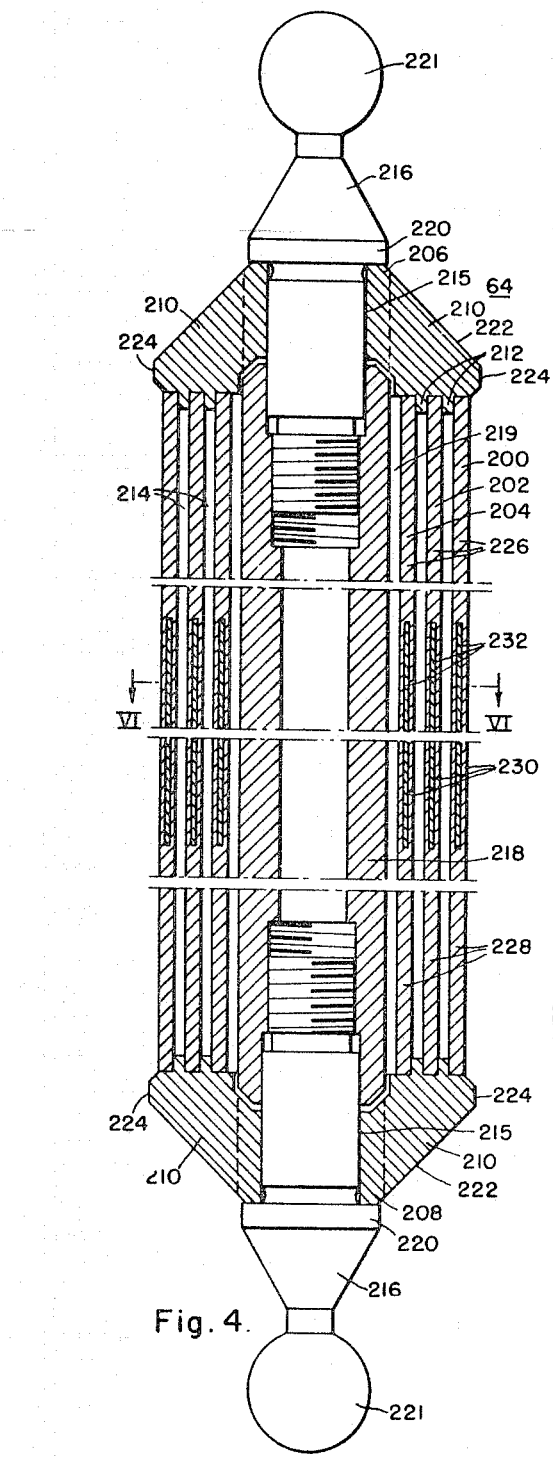
FIG. 4 is an enlarged, foreshortened, sectional view of one of the fuel elements utilized within the reactor core, which view is taken along reference lines IV—IV of FIG. 5.
Figure 5:
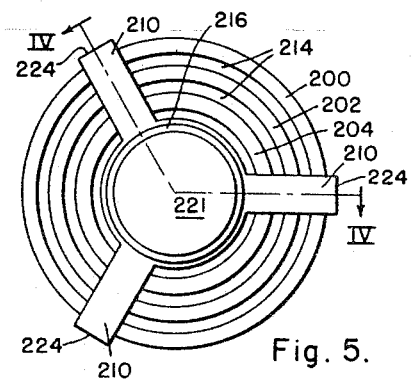
FIG. 5 is an end view of FIG. 4.
Figure 6:
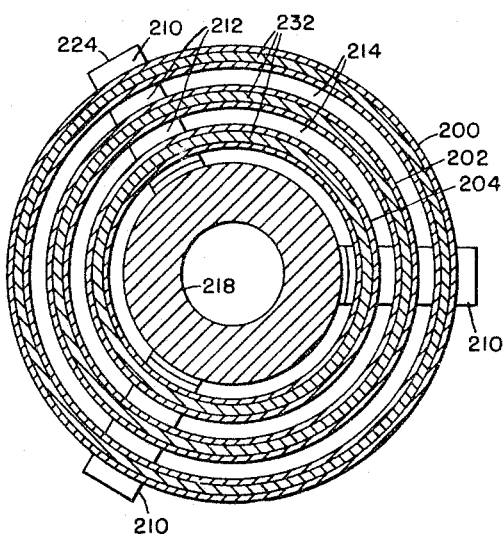
FIG. 6 is a sectional view taken along reference lines VI—VI of FIG. 4.

Referring now to FIGS. 4 to 6 of the drawings, there is shown therein one form of fuel element assembly adapted for use with the nuclear reactor of the character described and constructed in accordance with the teachings of the present invention. One such arrangement of the fuel element 64 comprises, in this example, three coaxially nested tubes or elongated annular members 200, 202 and 204 and upper and lower brackets 206 and 208. Each of the brackets 206 and 208 includes a number of outwardly extending spokes 210 provided on the underside thereof with tabs 212 adapted to be inserted between the nested tubes 200, 202 and 204 to maintain the tubes in coaxial alignment with one another in order to afford coolant passages 214 therebetween. The upper and lower brackets 206 and 208 are maintained in clamping relationship with the coaxial tubes 200, 202 and 204 by clamping members 216 inserted respectively through central apertures 215 of the brackets 206 and 208, and threadedly engaging a centrally disposed supporting tube 218. The supporting tube 218 is aligned coaxially by the clamping members 216 with the innermost nested tube 204 in order to provide an additional coolant passage 219 through the fuel element 64. The clamping members are each provided with a shoulder 220 engaging the brackets 206 and 208, respectively, and with an outwardly extending spheroidal knob 221 to facilitate handling the fuel elements 64, for example, in a manner presently to be described. At least the outer end portions of the spokes 210 are inclined or are chamfered as indicated by the reference character 222 in order to properly seat against the chamfered portions 82 (FIG. 3) of the apertures 80 in the bottom end plate 70, as noted heretofore. Each of the spokes 210 protrude outwardly of the outermost nested tube 200 of the fuel element assembly, as shown at 224, in order to properly space the fuel element assembly 64 relative to the associated reactor core sleeve 66 (FIG. 3).

Each of the nested tubes 200, 202 and 204 includes an inert section 226, an inert section 228 and a core section 230. Embedded within each of the core sections 230 is a layer of atomic fuel 232 including, in this example of the invention, an alloy of 13% of enriched uranium and a balance of aluminum. The upper inert section 226 desirably is made substantially equal in length to that of the lower inert section 228 in order that the core section 230 will be suspended centrally of the reactor core 30. The atomic fuel 232 preferably is metallurgically bonded to the material of the concentric sleeves 200, 202 or 204 in order to ensure adequate heat transfer from the atomic fuel 232 to the coolant passing through the passages 214 and 219. Such metallurgical bonding is facilitated by fabricating the inert material of the tubes 200, 202, 204 from material identical to that comprising the major portion of the uranium alloy, with aluminum being utilized in this example.

It has been indicated heretofore that the peak power output of the reactor or the maximum neutronic fluxile density herein can be changed by removing some of the fuel elements 64 or by inserting additional fuel elements into those holes 78 which are indicated as being vacant in FIG. 2. On the other hand, change in the power output or fluxile density or the distribution thereof within the core 30 can be effected by adding or subtracting one or more of the nested tubes 200, 202 and 204 in some or all of the fuel elements 64. Since the fuel elements 64 are symmetrical along the longitudinal axis thereof, increased burnup of the fuel elements 64 can be attained by withdrawing and reinserting the fuel elements 64 in an inverted position within the reactor core 30, as well as by the customary rearrangement of the fuel elements in accordance with radial fluxile variations within the reactor core. This follows from the fact that it has hitherto been determined that neutronic fluxile density within a given reactor core is uneven along the length of the fuel elements suspended therein resulting from the usual partial insertion of the control rods into the reactor core. Inasmuch as the fuel elements 64 can be removed one by one from the reactor core 30 without the necessity of disassembling the core 30, it will be apparent that one or more of the fuel elements 64 can be withdrawn from the core 30 for inversion or rearrangement therein without disturbing the balance of the fuel elements 64.

Figures 7, 8:
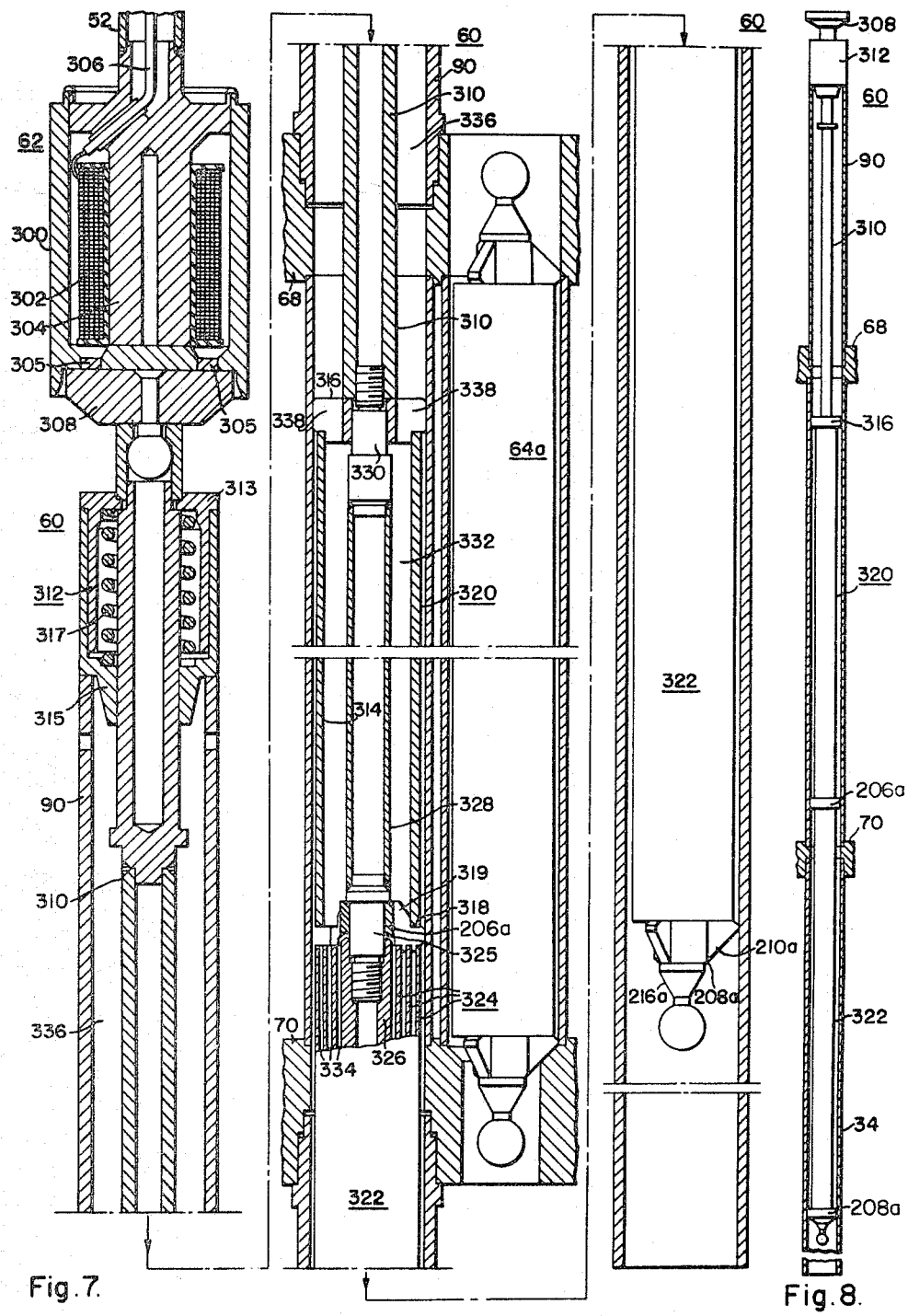
FIG. 7 is an enlarged, tripartite, longitudinal sectional view of one form of control rod assembly utilized within the atomic reactor of the present invention.
FIG. 8 is a diagrammatic elevation view partly in section of the control rod assembly.

Referring now to FIGS. 7 and 8 of the drawings one form of control rod assembly adapted for use with the reactor core 30 and constructed in accordance with the teachings of this invention is shown therein. In this example of the invention the control rod assembly 60 comprises a scram magnet housing 300, secured at the upper end thereof to one of the control rod drive shafts 52, and arranged for insertion through the associated lower guide sleeve 56 (FIG. 1). Mounted within the scram magnet housing 300 is a scram magnet coil 302 wound upon a suitable core 304 comprising a fluxile gap formed by a non-magnetic ring member 305, and having leads 306 thereof passing upwardly through the hollow control rod drive shaft 52. The scram magnet coil 302 and core 304 are adapted to attract an armature 308 fabricated from magnetic material and secured to the upper end of a control rod supporting tube 310. Mounted adjacent the upper end of the supporting tube 310 is a conventional shock absorber 312 adapted to cooperate in association with the upper end of the control rod shroud tube 90 to absorb at least part of the shock of the descending control rod assembly 60 in the event the latter is scrammed. The shock absorber 312 includes, in this example, an upper cup member 313 rigidly secured to the control rod supporting tube 310 and interfitting within a lower cup member 315 slidably mounted upon the supporting tube 310. Shock energies resulting from the lower cup member 315 striking the upper end of the upper shroud tube 90 are absorbed by a spring 317 interposed within the cup-shaped members 313 and 315.

The control rod assembly is shown here in its scrammed or lowermost position, for purposes of illustration, whereat the neutron absorbing material contained within, and distributed along the length of, one or more tubular elements 314 of the control rod assembly is positioned substantially centrally of the end plates 68 and 70 of the reactor core 30. Thus, the neutron absorbing tube 314, at the aforesaid scrammed position of the control rod assembly, is supported adjacent the core section 230 of the fuel elements 64, as illustrated by one of the fuel elements 64a shown in FIG. 7. The neutron absorbing tube 314 is supported, in a manner presently to be elaborated upon, between an upper, spoked bracket 316 and a modified fuel element bracket 206a having suitable indentations or shoulders 318 formed in the spokes 319 thereof to receive and engage the lower end of the neutron absorbing tube 314.

For purposes of preventing or minimizing perturbations in the neutronic flux existing within the reactor core 30, as control rod section 320 (FIG. 8) comprising the neutron absorbing tube 314 (FIG. 7) is withdrawn from the reactor core 30, a fuel element section 322, desirably similar in construction and nuclear characteristics to that of the fuel elements 64, is secured in tandem to the lower end of the control rod section 320 for movement therewith. The fuel element section 322 therefore includes, in this example, a plurality of coaxially nested tubes indicated generally at 324 and secured in spaced relationship by bottom bracket and clamping member 208a and 216a, respectively, like the bracket 208 and clamping member 216 described heretofore in connection with FIGS. 4–6 of the drawings, and by the modified upper bracket 206a and a lower connecting link 325 threadedly engaging a supporting tube section 326 positioned coaxially within the fuel element 322. The connecting link 325 is welded or otherwise attached at the other end thereof to a supporting tube section 328 disposed coaxially within the control rod section 320. The supporting tube section 328 is secured to the control rod assembly supporting tube section 310 by means of an upper connecting link 330. With the aforesaid disposition of the supporting tube section 328 within the neutron absorbing tube 314, a channel 332 is formed therebetween for the passage of water or other coolant fluid. The channel 332 communicates, through the spokes 319 of the upper fuel element bracket 206a, with passages 334 existing between the concentric tubes 324 and the supporting tube section 326 of the fuel element section 322.

In the aforedescribed arrangement, when the control rod section 320 is withdrawn upwardly and out of the reactor core 30, the fuel element section 322 is then positioned within the reactor core 30 adjacent the normally placed fuel elements 64. Therefore, the perturbations in the neutronic flux within the reactor core 30, caused by moving one or more of the control rod assemblies 60 relative to the reactor core 30 (FIGS. 2 and 3), are minimized or prevented altogether by an accompanying insertion or withdrawal of the individual fuel element sections 322 forming a part of the control rod assemblies 60. When the control rod section 320 thereof is completely inserted into the reactor core 30, that is to say in the lowermost position of the control rod assembly 60, the associated fuel element section 322 then protrudes, via enlarged lower end plate apertures 80a (FIG. 3), through the bottom plate 70 of the reactor core 30 and is suspended within the lower shroud tube 34, as better shown in FIG. 8.

Cooling of each control rod assembly 60, whether the position of the assembly 60 is such that either the neutron absorbing section 320 or the fuel element section 322 is wholly or partially within the reactor core 30, is accomplished by the flow of coolant through the reactor vessel, as described heretofore relative to the reactor core sleeves 66 (FIGS. 1–3). More specifically, in the case of the control rod assemblies 60, the coolant enters the upward, open ends of the shroud tubes 90 (FIG. 1), secured to the upper end plate 68 of the reactor core 30; passes downwardly through each annular channel 336 between the control rod supporting tube section 310 and the shroud tube 90; flows between spokes 338 of the upper neutron absorbing tube bracket 316 into the communicating neutron absorbing section channel 332 and the fuel element section passages 334, described in the preceding paragraph; and thence passes between the spokes 210a of the bottom fuel element bracket 208a and out of the reactor core 30 via the open lower end (FIG. 1) of the lower control rod shroud tube 34. The coolant is then withdrawn from the reactor vessel 20, as described heretofore, by way of the annular passages 138 and the outlet duct 139.

Figure 9:
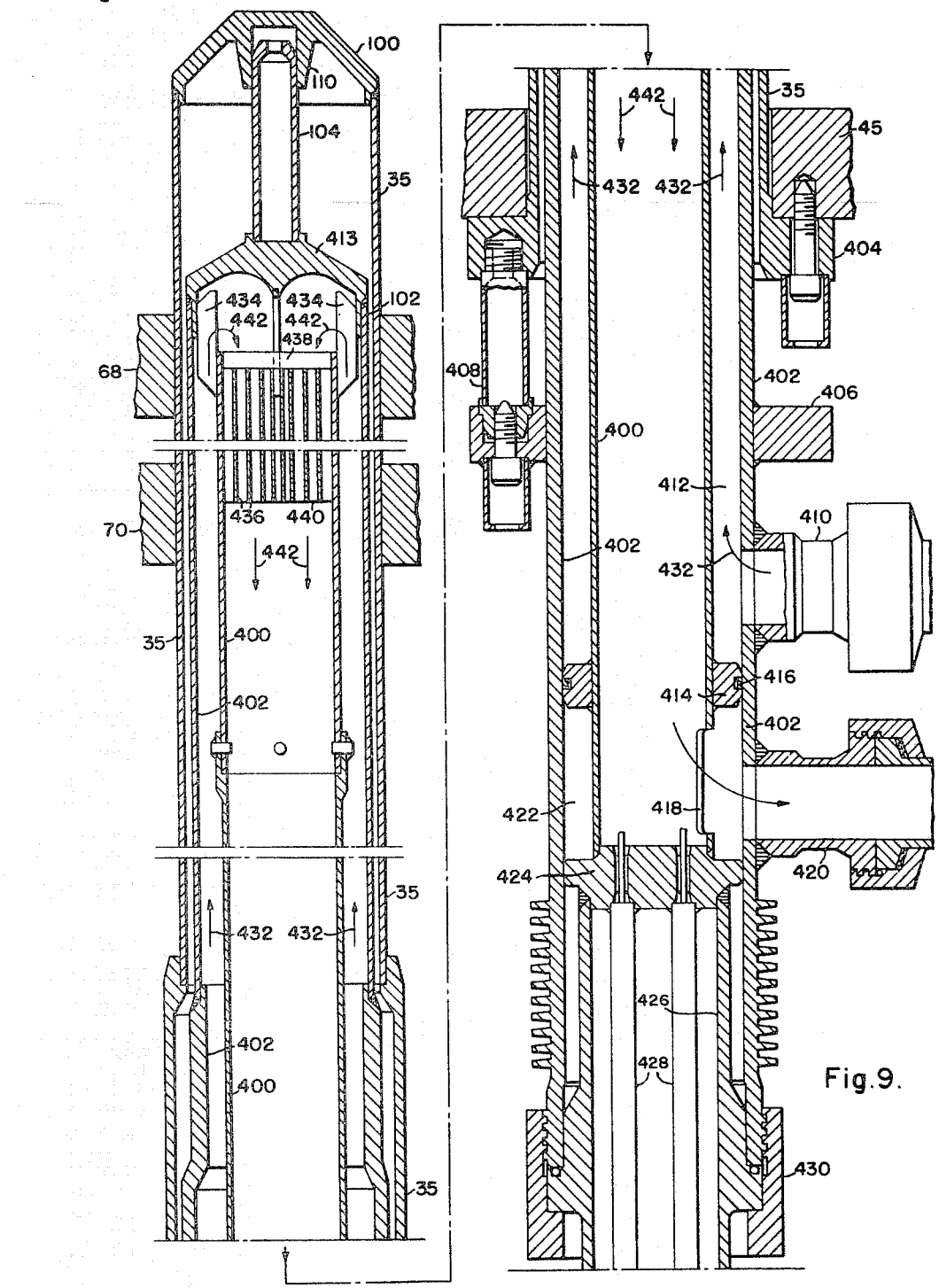
FIG. 9 is an enlarged, bipartite, longitudinal sectional view of one form of high pressure testing thimble utilized within the reactor core.

FIG. 9 shows in greater detail one of the high pressure testing thimbles, alluded to more generally heretofore in connection with FIGS. 1 to 3 of the drawings. One arrangement for pressurizing, and maintaining the desired temperature in the high temperature testing thimbles, for example, the central testing thimble 102 (FIGS. 3 and 9) includes the inner and outer cylinders 400 and 402 extending longitudinally through the tubular casing 35, and protruding through the lower end thereof, which casing is secured, as noted heretofore, to the bottom closure 44 of the reactor vessel 20. The outer sleeve 402 of the testing thimble 102 is secured to the flange 404 of the tubular casing 35 by means of a collar 406 welded to the exterior of the outer sleeve 402 and by means of a number of bolt and spacer arrangements indicated generally by the reference character 408.

Immediately below the collar 406 an inlet conduit 410 is provided for the purposes of admitting pressurized water or other fluid into an annular space 412 enclosed between the inner and outer sleeves 400 and 402. The annular space 412 is terminated at the upper end thereof by the cap 413 of the testing thimble 102, and at the lower end thereof by a spacing collar 414 welded adjacent the lower end of the inner sleeve 400. Suitable sealing means 416 is provided on the outer periphery of the collar 414 to afford a water-tight engagement of the collar 414 with the outer sleeve 402. At a position adjacently below the collar 414, the inner sleeve 400 is provided with an opening 418 which communicates with an outlet conduit 420 and with an annular space 422 between the inner and outer sleeves 400 and 402, and limited by the collar 414 and a bottom closure 424 sealed to the lower end of the inner sleeve 400. The bottom closure 424 forms a snug fit with the outer sleeve 402 and is hermetically sealed to a casing 426 surrounding suitable instrument wiring or tubing indicated schematically by leads 428. The casing 426 is hermetically sealed to and supported by the lower end of the outer sleeve 402 by means of a suitable coupling and packing arrangement indicated generally by the reference character 430.

During operation of the nuclear reactor, high pressure water or other fluid is admitted into the annular space 412 by way of the conduit 410, as indicated by flow arrows 432. The pressurized fluid then flows upwardly between the inner and outer sleeves 400 and 402 and near the top of the testing thimble 102, flows between radial supporting plates 434, which plates are arranged to space the upper end of the inner sleeve 400 relative to the outer sleeve 402. The pressurized fluid then flows downwardly among testing specimens 436, which may take the form of concentric tubes supported, by means of brackets 438 and 440, within the inner sleeve 400 at a position intermediate the reactor core end plates 68 and 70 (FIG. 3). The pressurized fluid then flows downwardly through the inner sleeve 400 as indicated by flow arrows 442 and exits through the outlet conduit 420 by way of the aperture 418 and annular space 422.

With the testing arrangement illustrated in FIG. 9, it is apparent that materials to be associated with nuclear reactors can be tested at high temperature and pressures within the testing thimble 102, without subjecting the balance of the reactor core 30 to the same high pressures and temperatures, thereby permitting the testing specimens 436 to be subjected to conditions normally existing within a nuclear power reactor while permitting the test reactor to be operated at lower temperatures and pressures of the moderator and coolant fluid. Obviously, the temperatures existing within the testing thimble 102 can be adjusted by controlling the rate of flow of the pressurized fluid flowing therethrough to remove more or less of the heat developed in the testing thimble 102 by the nuclear chain reaction within the reactor core 30. A similar pressurizing arrangement is provided for each of the high pressure testing thimbles 118 shown in FIGS. 1 and 3 of the drawings and inserted individually into the tubular casings 36.

Turning now to FIGS. 10 to 12 of the drawings there is shown therein a manipulating tool adapted for use in handling the fuel elements 64 and the end plate plugs 136 (FIG. 3). The tool 500 is provided with a tubular handle 502 having sufficient length to permit lowering the tool 500, through the protective head of coolant overlying the reactor core 30, to the upper end plate 68 of the reactor core, from the top of the reactor vessel 20. The operable portion of the tool 500 includes a cylindrical housing 504 and a body member 506 threadedly engaging at the upper end thereof the tubular handle 502. The housing 504 is secured to the body member 506 in any convenient manner, as by shrink-fitting, and loss of the housing into the reactor is made virtually impossible through the provision of flange portions 507 formed integrally with the body member 506 adjacent the lower end thereof. Spaced around the circumference of the body member 506, the flange portions 507, being three in number in this example, are each provided with a shoulder 508 for engaging the lower end of the housing 504.

The body member 506 is provided with a centrally extending channel 509 and with a plurality of slots 510 extending longitudinally of said body member and adjoining the central channel 509. Inserted into each of the slots 510 is an operating lever 512 secured to body member 506 by means of a pivot pin 514 inserted through the body member 506 at a position adjacent the recesses 516 provided about the outer periphery of the body member 506. Near the lower end of the body member 506, the channel 509 opens into a widened portion 518 thereof adapted to receive the spheroidal knob 221 of the fuel element clamp 216 or the spheroidal knob 137 of the plug members 136 (FIGS. 3). To facilitate insertion of the knobs 221 or 137 into the widened portion 518, the body member 506 is formed with a chamfer 520 at the lower end thereof and adjacent the widened channel portion 518.

Near the lower end of each of the operating levers 512 a projection 522 is provided and is adapted, upon manipulation of the levers 512, in a manner presently to be described, to engage the undersurface 523 of the spheroidal knobs 221 or 137 and to secure the knob within the widened channel portion 518, in order to permit lifting thereof by the tool 500.

One arrangement for manipulating the levers 512 to cause the projections 522 thereof to engage the knob 221 or 137 includes an operating extension 524 formed on each of the levers 512 adjacent the upper end thereof and adapted to engage a tapered pin 526 which is mounted for movement within the longitudinal channel 509. The pin 526 is coupled to an elongated connecting rod 528 extending through the elongated handle 502 and operated at the upper end of the handle 502 by a suitable mechanism including a guide rod portion 529 slidably fitted within the tubular handle 502 and adjoining a knurled knob 530 and the connecting rod 528.

The upper limit of movement of the pin 526 and connecting rod 528 is determined by a stop pin 531 on the guide rod portion 529 operating within a slot 532 disposed in the elongated handle 502 adjacent the upper end thereof. The pin 526 is furnished adjacent the upper end thereof with a connecting link 533, which is threadedly secured to the connecting rod 528 and is adapted to engage shoulder 534 of the body member 506 to limit the downward travel of the operating rod 528 and pin 526. Upon withdrawal of the pin 526 a cam surface 536 provided on each of the projections 522 for moving in engagement with the undersurface 523 of the spheroidal knob 221 or 137 causes the lower end of the levers 512 to move outwardly and away from the channel 509, thereby effecting release of the spheroidal knob 221 or 137 secured within the widened channel portion 518.

In the following illustrative operating arrangement of the nuclear reactor forming the subject of the present invention it should be appreciated that the dimensions, masses, proportions and the like noted therein is presented by way of illustration only and not as substantive limitations upon the present invention. Assuming the reactor is to have a peak thermal output of 20 megawatts (mw.), a cylindrical reactor core structure approximately 50 inches in height and 44 inches in diameter is utilized. As is noted heretofore, the upper and lower end plates of the core are provided with like numbers of apertures arranged in a triangular lattice and spaced approximately 3 inches apart. Clustered about the central portion of the reactor core 30 are 51 fuel elements 64, each comprising three concentric tubes 200, 202 and 204, as described heretofore and each fuel element including a total of 200 grams of 90% enriched uranium. For testing applications of the reactor a pressure of 125 pounds per square inch can be maintained within the reactor core 30 in order to prevent boiling of the coolant and moderator fluids, which in this case are both light water. In accordance with the aforedescribed conditions approximately 14,000 gallons per minute of cooling water is required, which yields a temperature differential within the reactor core in the neighborhood of 10° F. As pointed out in the aforegoing description a total of nine control rod assemblies 60 are utilized to control the nuclear chain reaction within the reactor core 30, which assemblies are provided altogether with a quantity of neutron absorbing material, for example, eleven pounds of cadmium per rod, more than sufficient to terminate the aforesaid chain reaction when the control rods are completely inserted into the reactor core.

When operating the disclosed atomic reactor for power purposes in case of light water being used as a coolant and heavy water for a moderator, pressures of 2,000 to 2,500 pounds per square inch and temperatures of 500 to 600° F. can be maintained within the reactor core. The quantity of coolant utilized can be substantially equivalent to the rate of flow noted in the preceding paragraph, which, however, in the latter case will yield a temperature differential of approximately 25° F. within the reactor core, where an equivalent amount of atomic fuel is used.

Because the subject matter of the present invention involves a frontier, or a comparatively new art, a more detailed description of the structure thereof is given than is actually necessary to enable one skilled in this art to follow the teachings of the invention. It is to be understood therefore that the foregoing structural details are presented, not by way of limitation of the invention, but merely as suggestive examples of a few of many applications of the invention. Therefore, it is contemplated that numerous modifications of the invention will occur to those versed in the art without departing from the scope of the appended claims. It will be understood further, and it is obvious from the foregoing detailed description of the invention, that certain features thereof can be utilized without a corresponding use of other features.

What is claimed is:

1. A nuclear fuel element for use within a nuclear reactor core comprising a plurality of concentrically nested tubes, a mass of nuclear fuel material forming part of each one of said tubes, and means for holding said tubes in laterally spaced relationship with one another.

2. A nuclear fuel element for use within a nuclear reactor core comprising a plurality of coaxially nested tubes, a mass of nuclear fuel material forming part of each of said tubes, a supporting rod extending axially of said tubes, a pair of brackets engaging individually the ends of said tubes, said brackets including spacing tabs inserted between said tubes, and a pair of clamping members individually secured to said central supporting rod for clamping said brackets and said tubes together relative to said supporting rod.

3. A nuclear fuel element adapted for insertion within channels formed therefor within a neutronic reactor core, said fuel element comprising a plurality of substantially coaxially nested tubes; a mass of nuclear fuel material forming part of each of said tubes; a central supporting rod extending substantially axially of said tubes; a pair of brackets engaging individually the ends of said tubes, each of said brackets including a plurality of outwardly extending spokes and spacing tabs disposed on said spokes, said tabs being inserted between said tubes and spacing said tubes relative to one another and to said supporting rod, said spokes protruding outwardly of the outermost of said tubes to space said fuel element from the walls of said channels when inserted therein, and a pair of clamping members individually secured to said central supporting rod for clamping said brackets and said tubes together relative to said supporting rod.

4. A nuclear fuel element for use within a nuclear reactor core comprising an elongated member containing nuclear fuel material, at least one tube containing nuclear fuel material and surrounding said first member, and means for holding said tube in laterally spaced relationship with said first elongated member and forming at least one flow passage therebetween.

5. A nuclear fuel element for use within a nuclear reactor core comprising a plurality of annular members, a mass of nuclear fuel material forming part of each one of said members, at least one of said members being mounted in laterally spaced relationship within another of said members, and support means for holding said members in laterally spaced relationship.

6. The combination of claim 5 wherein the mass of fuel material in each of said members is annularly shaped.

7. The combination of claim 5 wherein said annular members are substantially coextensive with each other and form a plurality of flow passages therethrough.

8. The combination of claim 7 wherein each of said annular members includes an inner sleeve, an outer sleeve disposed outwardly of said inner sleeve, and said fuel material is sealably disposed therebetween.

9. The combination of claim 8 wherein said annular members are coaxially aligned, the mass of fuel material in each of said annular members is annularly shaped, and said inner sleeve and said outer sleeve in each of said annular members is formed from a corrosion resistant cladding material.

10. The combination of claim 9 wherein said nuclear fuel material is centrally disposed in the longitudinal direction, and said support means is detachably secured to said annular members.

References Cited by the Examiner

UNITED STATES PATENTS

| | | | |
|---|---|---|---|
| 2,849,387 | 8/1958 | Brugmann | 176—82 X |
| 2,852,456 | 9/1958 | Wade | 176—83 X |
| 2,852,458 | 9/1958 | Dietrich et al. | 176—86 X |
| 2,863,814 | 12/1958 | Kesselring et al. | 176—82 |
| 2,879,216 | 3/1959 | Hurwitz et al. | 176—83 X |
| 2,898,280 | 8/1959 | Schultz | 176—78 |
| 2,902,422 | 9/1959 | Hutter | 176—78 |
| 2,983,659 | 5/1961 | Treshow | 176—86 |
| 2,985,575 | 5/1961 | Dennis et al. | 176—43 |
| 2,990,349 | 6/1961 | Roman | 176—83 X |
| 3,138,538 | 6/1964 | Bowden | 176—67 |
| 3,164,528 | 1/1965 | White | 176—67 |
| 3,177,124 | 4/1965 | Eggen et al. | 176—86 |
| 3,192,123 | 6/1965 | Costes et al. | 176—86 |

CARL D. QUARFORTH, *Primary Examiner.*

BENJAMIN R. PADGETT, *Examiner.*

M. J. SCOLNICK, *Assistant Examiner.*